(12) United States Patent
Tiruvallur et al.

(10) Patent No.: US 6,708,269 B1
(45) Date of Patent: Mar. 16, 2004

(54) METHOD AND APPARATUS FOR MULTI-MODE FENCING IN A MICROPROCESSOR SYSTEM

(75) Inventors: Keshavan K. Tiruvallur, Tigard, OR (US); Douglas M. Carmean, Beaverton, OR (US); Robert J. Greiner, Beaverton, OR (US); Muntaquim Chowdhury, Portland, OR (US); Madhavan Parthasarathy, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,098

(22) Filed: Dec. 30, 1999

(51) Int. Cl.$^7$ .............................. G06F 9/312
(52) U.S. Cl. .................. 712/225; 712/23; 712/218; 711/141; 709/400
(58) Field of Search .................. 712/23, 218, 225; 709/400; 711/141

(56) References Cited

U.S. PATENT DOCUMENTS

| | | | |
|---|---|---|---|
| 4,658,355 A | * | 4/1987 | Hatakeyama et al. .......... 712/4 |
| 5,434,995 A | * | 7/1995 | Oberlin et al. ............... 709/400 |
| 5,751,986 A | * | 5/1998 | Fetterman et al. .......... 712/218 |
| 6,073,210 A | * | 6/2000 | Palanca et al. ............. 711/118 |
| 6,463,522 B1 | * | 10/2002 | Akkary ....................... 712/216 |

* cited by examiner

Primary Examiner—Kenneth S. Kim
(74) Attorney, Agent, or Firm—Blakely, Sokoloff, Taylor & Zafman LLP (57) ABSTRACT

In a multi-threaded system, such as in a multi-processor system, different types of fences are provided to force completion of programmatically earlier instructions in a program. The types of fences can be thread-specific, and different types of fences are used based on different kinds of conditions, instructions, operations, or memory types. When a fence is executed, senior stores, request buffers, bus queues, or any combination of these stages in an execution pipeline can be drained. Fetches at a front end of the pipeline can also be killed to ensure that the bus queue can be drained.

25 Claims, 3 Drawing Sheets

| Type | Drain Senior Stores (82) | All pending DAC RB pass GO (84) | Writeback Open WC Buffers (86) | Flush BusQ of Pending (88) | Thread Specific (92) | MOB Deallocation Point (94) | Blocks Younger Loads (96) | DAC RB Allocated (98) | UOP Retirement point (100) | At Retirement (102) |
|---|---|---|---|---|---|---|---|---|---|---|
| A | No | Yes | Yes | All requests | NO | All previous uOPs written to memory | No | No | Last bus complete for either thread | Yes |
| B | Yes | Yes | Yes | All requests | Yes | All previous uOPs pass GO. All previous uOPs written to memory | Yes | Yes | Thread Specific Bus complete | Yes |
| C | Yes | Yes | No | None for cache lock. All for bus locks. | Yes | NA (this is a load) | No | Yes | Data return. | Yes |
| D | Yes | Yes | No | None | Yes | All previous uOPs pass GO. DAC blocks younger uOPs until this uOP passes GO. | Yes | Yes | Thread Specific Bus complete or cache hit | Yes |
| E | Yes | Yes | No | I/O requests | Yes | All previous I/O operations completed on the bus. DAC blocks younger uOPs until this uOP completes on the bus | Yes | Yes | Thread Specific Bus complete | Yes |
| F | Yes | Yes | Yes | None | Yes | All pending WC buffers deallocated | No | No | WC dealloc. Can be before Bus Complete | No |

FIG. 3

METHOD AND APPARATUS FOR MULTI-MODE FENCING IN A MICROPROCESSOR SYSTEM

BACKGROUND OF THE INVENTION

1. Field of the Invention

The present invention relates generally to controlling the flow of program instructions in a microprocessor system, and more particularly, to controlling the flow of program instructions in a microprocessor system through the use of "fences" or "fencing" control operations.

2. Background Information

Typical computer systems use a single central processing unit (CPU), known as a microprocessor. This microprocessor executes the programs stored in main memory by fetching their instructions, examining them, and then executing them one after another according to their programmatic order.

More advanced microprocessors utilize out-of-order processing or speculative processing, rather than in-order processing, to improve microprocessor efficiency by exploiting parallelism in the programs or pipelining capabilities of the microprocessor. In out-of-order processing, a software program is not necessarily executed in the same sequence as its source code was written. In speculative processing, branch prediction is performed pending resolution of a branch condition. Once the individual microinstructions are "dispatched" and subsequently executed, their results are stored in a temporary state. Finally, microinstructions are "retired" once all branch conditions are satisfied or once out-of-order results are determined to be correct. Examples of these microinstructions include "write" (sometimes referred to as a "store") instructions to write data into memory, and "read" (sometimes referred to as a "load") instructions to read data from memory. The success of out-of-order or speculative processing depends in part on the accuracy, consistency, and synchronization of the data that they process.

Invariably, there will be locations in a program where one or more sets of instructions or their associated operations will need to rely on the results of a previous (e.g., programmatically earlier) instruction or operation. Fencing control operations (or simply "fences") have been used to synchronize the operation of the microprocessor in these situations. For example, in an out-of-order execution microprocessor, a special form of a "store address" microoperation fences all memory access and retires all execution results up to the store address microoperation. This fencing control operation prevents all loads from dispatching until the fence itself has been dispatched and has completed execution. The use of such a fence is needed to insure that the wrong data is not loaded or stored.

There are several situations when fences or fencing control operations are required, in addition to the situation where a program is being processed in an out-of-order or speculative manner. These include mode changes (e.g., a change from a real mode of operation to a protected mode of operation), lock operations (sometimes referred to as "semaphores"), serializing instructions, changes of memory type, and input/output (I/O) operations, etc. Prior art microprocessors typically address all of these situations by performing only one type of fencing control operation, regardless of the instructions or conditions that give rise to the fencing requirement. The typical single fencing control operation is to drain all "senior stores," which are data that are past retirement and being stored in buffers but are not yet committed to architectural or system state (e.g., to a cache or memory).

However, the process of draining all senior stores whenever a fencing need arises can exact a heavy toll on the efficiency of the microprocessor. It may take a long time for the senior stores to drain. Perhaps these may never drain if data is continuously being fed into the bus. Also, some instructions, operations, memory transactions, or conditions that give rise to the need for fencing do not necessarily require the draining of all, or perhaps any, of the senior stores. Hence, the existing "one size fits all" single fencing approach unnecessarily delays the execution of some types of instructions. This situation is further complicated in computer systems that may use multiple microprocessors, where the single fencing approach would unnecessarily delay execution of programs in more than one microprocessor.

Accordingly, a more versatile and flexible approach to meeting fencing requirements is desired.

SUMMARY OF THE INVENTION

According to an aspect of the invention, a method is provided in which a processor detects a selected one of an instruction or a condition. In response, the processor dependently performs a selected one of a plurality of predetermined control operations to effectuate a desired synchronized state for the processor. The processor dependently performs the selected control operation based at least in part on the nature of the instruction or condition.

BRIEF DESCRIPTION OF DRAWINGS

Non-limiting and non-exhaustive embodiments of the present invention will be described in the following figures, wherein like reference numerals refer to like parts throughout the various views unless otherwise specified.

DETAILED DESCRIPTION OF THE ILLUSTRATED EMBODIMENTS

Embodiments of a method and apparatus to provide multiple types of fences (e.g., provide "multi-mode fencing") in order to fence according to certain conditions or particular types of operations performed by a microprocessor system are described in detail herein. A "fence" or "fencing control operation" as broadly used herein generally refers to one or more programmed instructions that forces completion of certain operations that would have otherwise taken their own natural course to complete, and therefore, synchronizes operation of the microprocessor system by ordering memory transactions that may not otherwise be guaranteed to be ordered. By having multi-mode fencing, the microprocessor system is able to provide different types of fences that optimize performance under various conditions or types of operations or instructions.

In the following description, numerous specific details are provided, such as the description of components of a microprocessor system in FIG. 2, to provide a thorough understanding of embodiments of the invention. One skilled in the relevant art will recognize, however, that the invention can be practiced without one or more of the specific details, or with other methods, components, etc. In other instances and in the interest of clarity, well-known structures or operations are not shown or described in detail to avoid obscuring aspects of various embodiments of the invention.

It is to be appreciated that in the development of any actual implementations that are based on the embodiments described herein, numerous implementation-specific designs and variations may be made to achieve specific goals and results, which may vary from one implementation to another. Moreover, it is also to be appreciated that such development efforts may be complex or time-consuming, consuming, but would nevertheless be a routine undertaking for those of ordinary skill in the art having the benefit of this disclosure.

Figure 1:
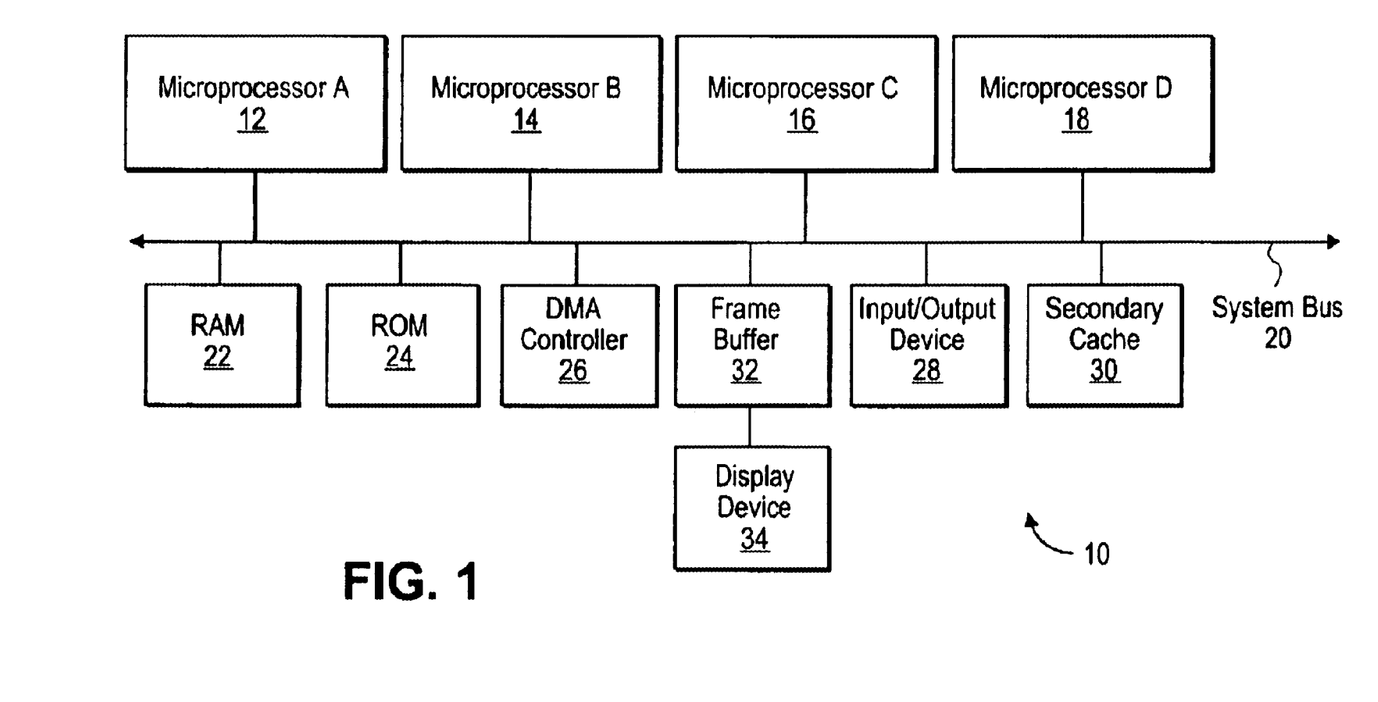
FIG. 1 is a block diagram illustrating a multiprocessor computer system that can utilize an embodiment of the invention.

Referring first to FIG. 1, shown generally at 10 is a block diagram of a computer system that can utilize an embodiment of the present invention. The computer system 10 can be a multiprocessor system having four microprocessors 12–18, for example, interconnected by a system bus 20.

Each microprocessor 12–18 can be associated with one "thread," and hence the computer system 10 is known as a "multi-threaded" system. While FIG. 1 shows four microprocessors 12–18, the computer system 10 can have any number of microprocessors, including just a single microprocessor. In one embodiment of the invention, for example, a single microprocessor can in turn be associated with multiple threads. Additionally, the plurality of microprocessors 12–18 can all be located on a single die, on multiple dies, or a combination of both in the computer system 10. Consequently, the invention is not limited by a specific number of microprocessors present or by their specific placement on one or more dies.

Each of the microprocessors 12–18 may be capable of speculative and out-of-order execution of instructions, as well as in-order execution. A random access memory (RAM) 22, read only memory (ROM) 24, direct memory access (DMA) controller 26, I/O device 28, and Level 2 (L2) secondary cache 30 are connected to the microprocessors 12–18 by the system bus 20. A frame buffer 32 and display device 34, such as a cathode ray tube (CRT), are also connected to the system bus 20. The DMA controller 26 can represent any number of DMA controller devices. Other memory devices (not shown), such as a disk drive, may also be connected to the system bus 20. The I/O device 28 can include a keyboard, modem, mouse, etc.

Although FIG. 1 shows the secondary cache as being separate from the microprocessors 12–18 and connected thereto by the system bus 20, the secondary cache may be present in each microprocessor 12–18. In other implementations, there may be a third cache provided internally in each microprocessor 12–18 or externally thereto via the system bus 20. As such, the invention is not limited by the number of caches or by their specific location in the computer system 10.

Figure 2:
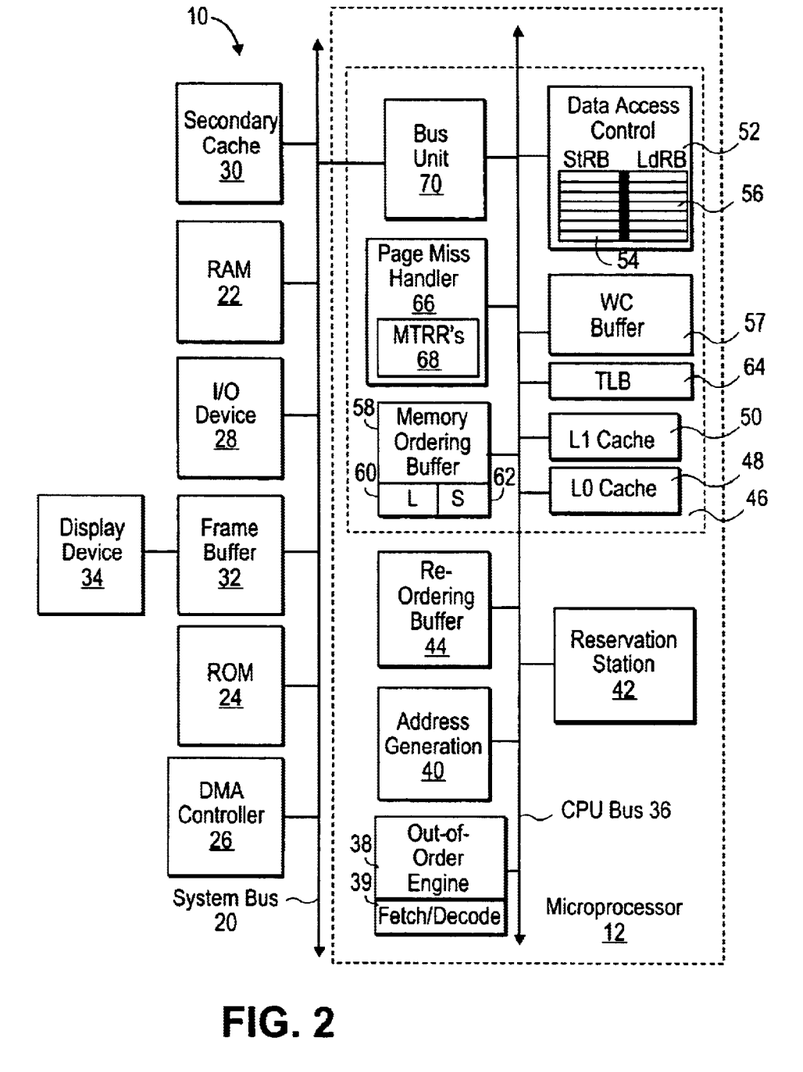
FIG. 2 is a block diagram illustrating components of one of the microprocessors of FIG. 1 according to an embodiment of the invention.

FIG. 2 illustrates some of the components of one of the microprocessors 12–18 of FIG. 1, such as the microprocessor 12, all internally connected by one or more busses illustrated symbolically by a CPU bus 36. Specifically, FIG. 2 shows an out-of-order engine 38 that breaks up a program or a complex instruction into microoperations (uOPs), such as memory loads and stores. The out-of-order engine 38 generates the uOPs in an out-of-order and/or speculative manner so as to exploit any parallelism within the program or to exploit pipelining capabilities of the microprocessor 12. The out-of-order engine 38 can include separate internal components such as an instruction fetch/decode unit 39, and microcode and allocater units (not shown). The fetch/decode unit 39 pulls/fetches the instructions that are subsequently broken up into uOPs and forms what is commonly referred to as the "front end" of the microprocessor 12.

An address generation unit (AGU) 40 generates a memory address for the uOPs. The uOP containing the address is output from the AGU 40 onto the CPU bus 36, where the uOP is intercepted and stored by a reservation station 42. The reservation station 42 allocates uOPs that have not yet been executed, and then dispatches the uOPs to other functional execution units (not shown) according to speculative data dependencies and according to the availability of the other functional units.

A reorder buffer 44 stores speculative results of uOPs dispatched by the reservation station 42 and executed by one of the functional units. That is, the reorder buffer 44 collects results of speculative uOPs, reorders the uOPs, and then retires the uOPs. The reorder buffer 44 does this by reordering the retirement of executed uOPs to yield a sequence of events specified by the program, with an executed uOP being retired once it becomes non-speculative (e.g., once all unresolved conditions or antecedents to the uOP have been resolved).

The microprocessor 12 includes a memory system or memory cluster 46. Each of the microprocessors 12–18 can include all of the components of the memory cluster 46 shown in FIG. 2. In other embodiments, the microprocessors 12–18 can share one or more components of a single memory cluster 46.

The memory cluster 46 can have multiple levels of on-board caches. For instance, the memory cluster 46 can include a Level 0 (L0) data-only cache 48, which can be an eight-kilobyte, "write-through" cache. With "write-through" protocol, data modified in the data cache 48 is immediately transmitted to external memory (e.g., to the RAM 22 or to the secondary cache 30). The memory cluster 46 can include a Level 1 (L1) cache 50, which contains both instructions and data. The cache 50 can be a 256-kilobyte, "write-back" cache. With "write-back" protocol, data modified in the cache 50 is not immediately transmitted to external memory, but rather, is held in abeyance and then transmitted to external memory in a burst mode. The memory cluster 46 can further include yet another cache (not shown) that is one megabyte in size, for example. Either or both of the caches 48, 50 can be distinct components in the memory cluster 46, or they can be cache lines (not shown) forming part of a data access control (DAC) unit 52.

The DAC unit 52 controls data caching transactions that involve caching data from external memory in order to expedite or satisfy load and store operations. The DAC unit 52 stores data or instructions and corresponding memory addresses of recently accessed portions of the external memory. The DAC unit 52 can include one or more internal buffers, such as a store request buffer 54 and a load request buffer 56, as well as internal cache lines (not shown). The store request buffer 54 is where senior stores place their data before the data is sent to the cache 50 or to the system bus 20. The load request buffer 56 is where load requests are tracked and kept ordered while getting data from the cache 50, secondary cache 30, or system bus 20.

The memory cluster 46 can include a write-combining buffer (WCB) 57, which may be located in the DAC unit 52 or located separately. The WCB 57 is a fill buffer that helps to reduce traffic on the CPU bus 36 by receiving generally uncacheable data. For example, if the WCB 57 has storage lines that are 32 bytes long, it can store four bytes at a time while the WCB 57 is "open." In this fashion, the WCB 57 is dynamically resized as it receives data. When a line or lines in the WCB 57 are filled with data, the WCB 57 is "closed," thereby resulting in a transfer of the stored data from the WCB 57 to memory, such as to the frame buffer 32 or the RAM 22. The WCB 57 can be used, for example, along with an MMX unit (not shown) in order to process multimedia data for graphics, video, and sound.

The memory cluster 46 also includes a memory ordering buffer (MOB) 58. Among other functions, the MOB 58 buffers load and store operations, and ensures that load operations are ordered with respect to older store operations prior to dispatching them to external memory devices or to the next stage in the pipeline, for example. The MOB 58 is further responsible for sequencing store operations through the memory hierarchy. The MOB 58 buffers load operations in a load buffer 60 and store operations in a store buffer 62.

A translation look-a-side buffer (TLB) 64 translates linear addresses of the caches, such as those of the caches 48 and 50, into corresponding physical addresses in the external memory. In a "real mode" of operation, the AGU 40 generates a linear address corresponding to memory instructions, and in a "protected mode" of operation, the AGU 40 generates a physical address which corresponds to a linear address. In the protected mode, to access an external memory location defined by a physical address, the linear address is first converted to a physical address by the TLB 64.

A page miss handler (PMH) 66 performs a "page table walk" to determine a physical address corresponding to a linear address of a memory instruction if there is a "miss." That is, as each new read or write command is issued, the memory cluster 46 looks to the cache 48, for example, to see if the information exists there. A comparison of the desired address and the addresses in the cache 48 is made. If an address in the cache 48 matches the address sought, then there is a "hit" (e.g., the information is available in the cache 48). The information is then accessed in the cache 48 so that access to the other cache 50 or to external memory is not required, thereby rapidly processing the command. However, if the information is not available in the caches 48 or 50, then there is a "miss," and the new data can be copied from external memory and stored in the caches 48 or 50 for future use.

The PMH 66 walks the page tables on any TLB misses (e.g., where the TLB 64 is unable to match a linear address with a physical address). For example, the PMH 66 can walk the page tables and assign linear addresses to physical addresses by looking at data contained in memory type range registers (MTTRs) 68. The MTTRs 68 can further contain information to help identify a memory type for a uOP being processed. Possible memory types that the MTTRs 68 can identify include uncacheable and non-speculatable memory (UC), an uncacheable speculatable write-combining memory (USWC), a restricted cacheability and speculatable memory (RC), a write-through cacheable and speculatable memory (WT), a write-protected cacheable and speculatable memory (WP), and a write-back cacheable and speculatable memory (WB). Other memory types can be defined that are consistent with the general principles of the invention.

The caches 48 and 50, DAC unit 52, WCB 57, MOB 58, TLB 64, and PMH 66 are connected together and are interconnected to other components of the microprocessor 12 by the CPU bus 36. A bus unit 70 allows data and instructions to be transmitted between the internal components of the microprocessor 12 and the external components, such as the secondary cache 30, RAM 22, and ROM 24 external memories. There is a "bus queue" on the CPU bus 36 if more than one transaction or pieces of data are present on the CPU bus 36 or if there is a cache miss.

In summary then, the MOB 58 receives retired uOPs from the reorder buffer 44, and places them in order in its load buffer 60 and/or store buffer 62. The retired uOPs stored in the MOB are thus the "senior stores." Afterwards, the PMH 66 and TLB 64 cooperate to locate memory addresses corresponding to the uOPs. The uOPs are then sent to the store request buffer 54 or load request buffer 56 of the DAC unit 52 (or to the WCB 57), and subsequently, the caches 48, 50 or the external memories (e.g., the secodary cache 30, RAM 22, ROM 24, or frame buffer 32) are accessed to complete the operation(s). Accordingly, it can be seen that before uOPs and/or their associated data are finally committed to memory, they are kept pending in the different stages of the pipeline that includes the MOB 58, the request buffers 54 and 56 of the DAC 52, or the bus queue in the CPU bus 36. It is these pipeline stages that may need to be drained by fencing control operations based on the nature of an instruction being executed by the microprocessor 12 or if certain conditions occur. That is, for example, if an instruction to be executed relies on the results of a programmatically earlier instruction, these two instructions may be located at different stages in the pipeline at any given time, and therefore, the programmatically earlier instruction needs to be forced into completion in order to synchronize operation and obtain correct results and/or data.

In further consideration as to when fencing control operations may be appropriate for the computer system 10, various memory ordering rules can be programmatically defined or constrained in accordance with particular system or performance requirements. These memory ordering rules are based on, but are not limited to, conditions that permit loads to pass stores, loads to pass other loads, etc. in the order of execution in a program, or determinations of whether an operation can be performed speculatively/out-of-order (for "weakly ordered" memory types) or in-order (for "strongly ordered" memory types). For the sake of brevity, these various memory ordering rules, including those ordering rules with respect to specific memory types (e.g., whether weakly ordered loads can pass UC loads/stores) are not described in detail herein, as many of such rules are familiar to those skilled in the art. However, it is understood that one or more fencing control operations according to an embodiment of the invention, may be programmed to recognize and operate according to these memory ordering rules.

Fencing control operations according to an embodiment of the invention further recognize and operate according to various memory types being processed via the pipeline illustrated in FIG. 2. These different memory types are recogized by the MTTRs 68 and require different processing and/or ordering requirements that are taken into account by fencing control operations, particularly if memory types change during the course of execution of a program. For instance, UC memory is uncacheable memory and includes, for example, memory mapped I/O (sometimes referred to as "active memory"). uOPs to UC memory are non-speculatable, and are uncacheable because a read or write to memory mapped I/O can undesirably result in side effects such as a system reboot. In other words, loads and stores to UC memory are performed by the microprocessor 12 only at retirement of the loads or stores, when the uOPs are placed back into programmatic order. USWC memory is generally implemented in the write combining buffer 57 and is used to write data to the frame buffer 32. Loads to USWC memory are performed speculatively, and stores are performed in order after retirement. RC memory relates to memory which is cacheable only in a primary cache, such as the caches 48 and 50, but not cacheable in an external cache, such as the secondary cache 30. RC loads may be performed speculatively, while RC stores are performed only after retirement. WT memory is memory processed by a write-through cache protocol. Loads to WT memory are performed speculatively, and stores for WT memory are performed only after retirement. WP memory is memory well-suited for caching ROM data. Cache lines associated with load uOPs to WP memory are cached within the DCU unit 52. However, for store uOPs, cache line data is not updated. Nevertheless, store uOPs are written to external memory using partial writes. Loads to WP memory are performed speculatively, and stores to WP memory are performed only at retirement. WB memory is memory processed generally in accordance with a write-back cache protocol. Loads to WP memory are performed speculatively, while stores to WP memory are performed only after retirement. While these general memory types and ordering rules are described herein, it is to be appreciated that the memory types and ordering rules may change from one computer system 10 to another depending on a particular implementation involved. In all cases, fences according to embodiments of the invention can be designed to accommodate these different implementations.

Therefore, the kinds of instructions or operations pending in various components (e.g., stages of the pipeline) of the microprocessor 12 or computer system 10, memory ordering rules, and memory types can dictate when a need for one or more fencing control operations arises. Other conditions or instructions that may require fencing control operations in relation to the above-described computer system 10 include mode changes or serializing instructions.

Fences according to an embodiment of the invention can comprise one or more uOPs tailored for the above-described conditions, instructions, or operations. The embodiments of fences can be uOPs that may or may not be part of a longer program flow. For example, a specific macroinstruction can be mapped to a single fence or to a single uOP. In other embodiments, an operation such as a lock operation, can include a separate fence for the lock sequence and a separate fence for the unlock sequence. In yet other embodiments, fences need not be part of a program being executed, but instead can be an independent routine or uOP that is called or executed when a need for a fence is identified. A feature of an embodiment of the invention is that the computer system 10 can choose among a selection of different types of fences according to different fencing conditions.

Figure 3:
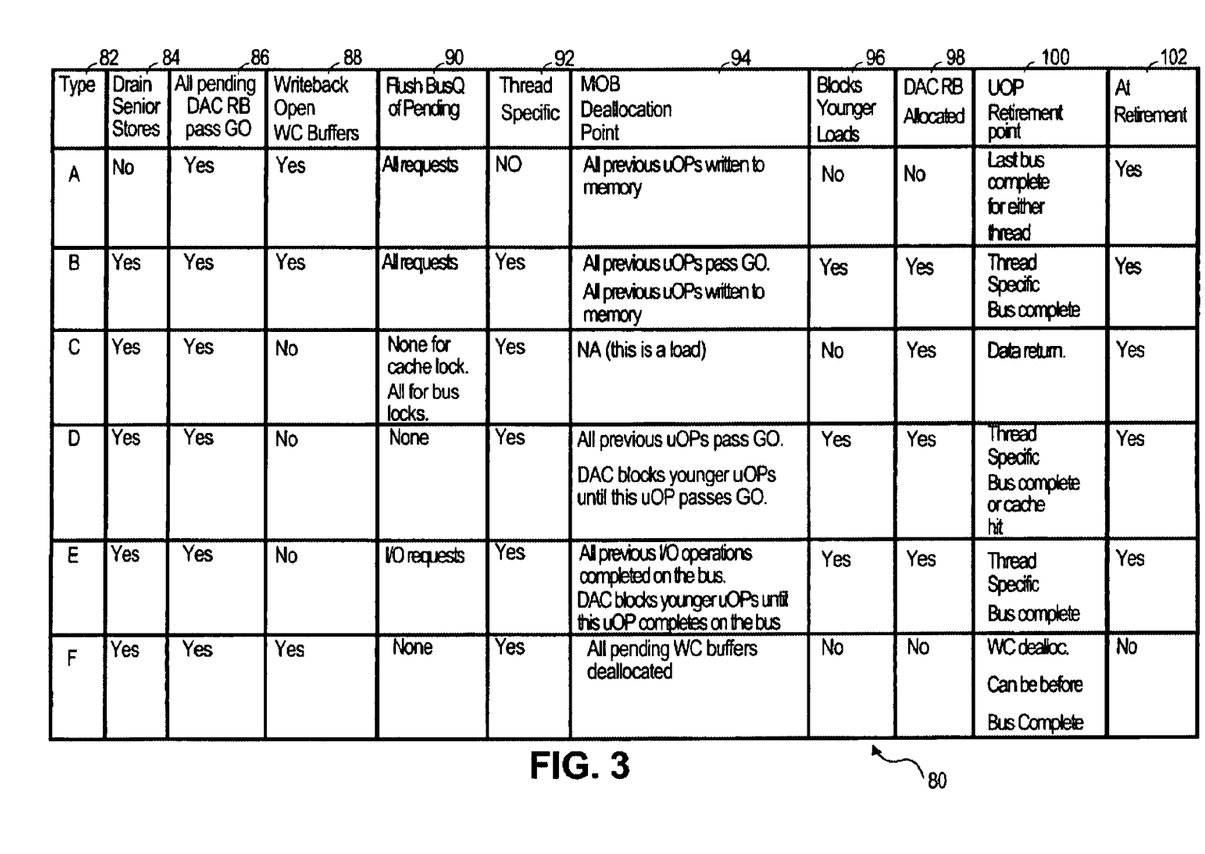
FIG. 3 is a table showing examples of fences that can be utilized by the computer system shown in FIGS. 1 and 2.

To help illustrate various features of fences according to embodiments of the invention, FIG. 3 shows a table 80 of different types 82 of fences A–F that can drain specific stages in the execution pipeline described above and strictly order execution of uOPs. Each fence type A–F in turn has several columns 84–102 in the table 80 that correspond to specific features of the fence types, which will be explained in further detail below. It is possible to provide other types of fences besides what is shown in table 80, and further, the individual features 84–102 can also be modified, if necessary, based on a particular implementation for any one of the fence types A–F.

For illustrative purposes, fence type B, which can be used for serializing instructions and/or for entering/exiting threads, will be described first. Fence type B has a feature 84 that progressively drains (before write-back operations) all senior stores in the MOB 58, and includes a feature 86 that all pending transactions (loads or stores) in the request buffers 54 and 56 of the DAC unit 52 are globally observed or drained before the fence type B uOP affects the memory cluster 46. Fence type B then further implements a feature 88 that causes a write-back of an open WCB 57 (e.g., by closing the WCB 57) and a feature 90 that drains or flushes pending transactions/data from the bus queue in the CPU bus 36. This draining can include pending snoops and I/O transactions. Fence type B is thread-specific (as indicated by the feature 92), such that if multiple processors or threads are being used, the features 84–90 and 94–102 affect a specific thread and not multiple threads.

According to a feature 96, the fence type B blocks younger loads. This fence type B can be used in conjunction with another uOP that suspends or "kills" instruction fetches from the front end (e.g., at the fetch/decode unit 39) of the microprocessor 12. If fetches are not killed, then the bus queues in the CPU bus 36 may never be drained of pending transactions/data, as required by the feature 90. Therefore, fetches are "killed" before issuing fences having this type of feature 96. This particular feature 96 also has the characteristic of ensuring that all younger loads may be guaranteed to see a consistent memory image after the fence type B has been completed.

An MOB deallocation point feature 94 lists conditions that need to be met before the fence type B uOP leaves the store buffer 62 of the MOB 58. Also, the deallocation point marks the last point where the fence type B uOP can affect the retirement of younger uOPs (e.g., specifies conditions that need to be satisfied before uOPs younger than the fence type B uOP are allowed to retire). The conditions listed in feature 94 can be read in conjunction with an at-retirement feature 102. That is, in operation, senior stores do not begin draining until a retirement pointer in the MOB 58 is pointing at the fence type B uOP. Then, while draining the senior stores and/or the bus queues, the uOPs younger than the fence type B uOP are held up. When all uOPs programmatically earlier than the fence type B uOP pass the global observation point and/or are written into memory, the fence type B uOP leaves the MOB 58, and the younger uOPs are allowed to retire.

Fence type B has a retirement point, as shown in the feature 100, that is thread specific and is reached when the last bus transaction on the CPU bus 36 is completed. Also, the fence type B may be allocated a location in the store request buffer 54 of the DAC unit 52 while it is pending or being executed.

Fence type A differs from fence type B in that senior stores are not drained, younger loads are not blocked, and there is no allocation in the store request buffer 54 of the DAC unit 52. Fence type A also is not thread-specific. That is, when the fence type A uOP is executed, it affects all threads in a multiprocessor system. Further, the fence type A uOP is retired, according to feature 100, when the last bus transaction on either thread is completed. Its MOB deallocation point is when all previous uOPs are written to memory.

Fence types C and D can be used for lock operations. A lock prevents a thread from performing a read, modify, write operation to a memory location while another thread is performing these operations on the data from that memory location. Fence type C is thread specific according to feature 92 and can be associated with the load aspect of a lock operation. According to features 84, 86, 88, and 98, fence type C drains senior stores in the MOB 58, requires global observation or draining of all pending transactions (loads or stores) in the request buffers 54 and 56 of the DAC unit 52, does not require closing of the WCB 57, and allocates a request buffer in the DAC unit 52 for the lock. With feature 90, if the load lock operation locks a cache, then bus queues need not be drained, but if the lock operation locks the CPU bus 36, then the bus queues are first drained to insure completion of pending transactions. Fence type C does not block younger loads. According to an embodiment of the invention, the feature 94 involving a MOB deallocation point is not applicable because fence type C involves a load operation that does not utilize the store buffer 62 in the MOB 58. The fence type C uOP can be retired when the data subject to the lock is returned (e.g., read), as indicated by the feature 100.

Fence type D can be associated with the store aspect of a lock operation that unlocks the locked memory location after performing the store operation, thereby allowing subsequent operations on that data. Fence type D prevents newer uOPs from passing the unlock fence type D. Fence type D includes many of the features of fence type C. Among the differences include the features that younger loads are blocked and bus queues are not drained. The MOB deallocation point is when all uOPs previous to the fence type D uOP pass the global observation stage. The DAC unit 52 blocks younger uOPs until the fence type D uOP passes the global observation stage. The fence type D uOP is thread specific and is retired when bus transactions are completed or when there is a cache hit for the data being stored.

Fence type E can be used for I/O operations. With this kind of fence, only pending I/O transactions specific to the thread that issued the fence are drained from the bus queues. The deallocation point of the fence type E from the MOB 58 is when all previous I/O operations are completed on the bus, and the DAC unit 52 blocks younger uOPs until this fence completes operation. The fence type D insures that older loads are completed.

Fence type F is one of the least-stringent and highest performance fences. This fence is directed towards closing the WCB 57 so that its contents can be transferred to external memory, such as to the frame buffer 32 to make the data available for graphics applications, without first being required to drain bus queues. The MOB deallocation point for this fence is after pending data in the WCB 57 is drained. Thus, in operation, the WCB 57 is progressively filled with data values while open, and when fence type F is received, the WCB 57 is drained. Fence type F further insures that younger stores do not pass stores previous to the fence. Although, the embodiment of fence type F shown in the table 80 of FIG. 3 shows that the senior stores are drained and that request buffers in the DAC 57 are drained or globally observed, it is possible to provide other embodiments of the fence type F where these are not performed.

Fences other than what is shown in the table 80 can be implemented by embodiments of the invention. These types of fences typically have implicit fencing semantics, rather than the explicit fencing semantics of the embodiments of the fence types A–F uOPs shown in the table 80. An example includes a fence that is used where a resource that affects memory references is being changed or updated with data. For instance, a fence may be used if the information stored in the MTTRs 68 is updated to indicate that a certain memory address range is being changed from WB to WT memory types. Other types of fences can include fences where: a WB store causes any store request buffer 54 of the DAC unit 52 to evict UC stores; a UC store causes any store request buffer 54 to evict USWC stores before the UC store is accepted; a UC store causes all store request buffers 54 that the UC store does not combine to be globally observed before the UC store is accepted; a WP or WT store causes any store request buffer 54 containing UC stores to be evicted; and a USWC store is canceled and redispatched until all store request buffers 54 containing UC stores are evicted.

In an embodiment of the invention, fence uOPs are allocated MOB 58 entries. That is, when specific fence uOPs (such as those shown in the table 80) are defined, they can be made to "look like" load and store operations. This can include instances when a fence uOP that essentially needs only a store address (STA) operation to function properly is nevertheless defined to have a store data (STD) operation partner. Defining the fence uOP in this manner makes the fence uOP appear like a typical store operation (which has an STA/STD component) to the MOB 58.

In summary, embodiments of the invention provide a computer system having multiple threads, with variable types of fences or fencing control operations available to specific threads. The fencing control operations can be tailored to optimize particular kinds of microprocessor operations or memory types by selectively identifying pipeline stages that are to be drained or selectively executing the fence at an appropriate time/stage in the pipeline. Further, embodiments of the invention can provide fences that are uOPs which may or may not be part of a longer flow. For example, in the case of fence type F shown in the table 80 of FIG. 3, a specific macroinstruction can map exactly to that single fence. In comparison to a lock sequence, for instance, two separate fences (e.g., fence types C and D) can be issued.

The described fences according to embodiments of the invention can be embodied in hardware controlled by program instructions, software or other instructions stored in a computer-readable or machine-readable medium, or other similar components, as those skilled in the art will recognize based on the description of the embodiments provided herein.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A microprocessor system, comprising:
   a first microprocessor coupled to a second microprocessor, the first and second microprocessors capable of speculative processing, the second microprocessor including:
   a front end to fetch instructions;
   a memory order buffer (MOB) coupled to the front end to receive microoperations associated with the fetched instructions, the MOB having a set of buffers to hold data associated with executed microoperations; and a data access control (DAC) unit coupled to the MOB and to a cache by a bus, the DAC having request buffers related to controlling a subsequent loading and storing of the data between the cache and the MOB, the MOB and the DAC being responsive to one of a plurality of different types of fence requests to force completion of at least one of the microoperations by draining data in the set of buffers of the MOB or data in the request buffers of the DAC, and delaying completion of other microoperations associated with the first microprocessor while the data is drained, the different types of fence requests corresponding to different types of memory operations or memory types.

2. The microprocessor system of claim 1, further comprising an external memory coupled to the first and second microprocessors, wherein the DAC triggers a writing of the data to the external memory if the data is drained from the set of buffers or the request buffers.

3. The microprocessor system of claim 1 wherein the DAC and MOB forces completion of the selected operations by delaying completion of operations in both the first and second microprocessors.

4. The microprocessor system of claim 1 wherein the fence requests are specific to threads associated with the first and second microprocessors.

5. The microprocessor system of claim 1, further comprising a write-combining buffer, the MOB sending data associated with the executed microoperations to fill the write combining buffer, the write-combining buffer draining the data to an external memory in response to one of the fence requests.

6. A method, comprising:

processing a plurality of instructions associated with a corresponding plurality of microprocessors;

providing the microprocessors with multiple fence requests;

receiving one of the multiple types of fence requests in one of the microprocessors;

identifying at least one stage of multiple stages in the one microprocessor to drain based on the received fence request;

forcing completion of at least some of the plurality of instructions associated with the one microprocessor by draining the identified stage; and delaying processing of instructions corresponding to the other microprocessors while the identified state is drained.

7. The method of claim 6 wherein the microprocessors are capable of speculative or out-of-order processing.

8. The method of claim 6 wherein providing the microprocessors with multiple types of fence requests include providing the microprocessors with fence requests associated with one of a serializing instruction, lock sequence, unlock sequence, input/output operation, write-combining buffer operation, memory type, and mode change.

9. The method of claim 6, further comprising killing instruction fetches at a fetch/decode unit of the one microprocessor if the fence request is received.

10. The method of claim 6 wherein draining the stage comprises draining a load or store buffer in a memory order unit of the one microprocessor.

11. The method of claim 6 wherein draining the stage comprises draining a bus queue of the one microprocessor.

12. The method of claim 6 wherein processing a plurality of instructions comprises filling a write-combining buffer with data, the method further comprising:

dynamically sizing the write-combining buffer as it is filled with data;

receiving an instruction to drain the write-combining buffer; and draining the data from write-combining buffer to a frame buffer in response to the received instruction.

13. The method of claim 6 wherein draining the identified stage comprises draining input/output requests from a bus queue of the microprocessor and allowing other types of requests to remain in the bus queue.

14. The method of claim 6 wherein at least one of the fence requests is thread specific.

15. The method of claim 6, further comprising deallocating the received fence request from a memory order buffer after previous instructions are written to a memory or to a cache.

16. A microprocessor, comprising:

a front end to fetch instructions;

a memory order buffer (MOB) coupled to the front end to receive microoperations associated with the fetched instructions, the MOB having a set of buffers to hold data associated with executed microoperations; and a data access control (DAC) unit coupled to the MOB and to a cache by a bus, the DAC having request buffers related to controlling a subsequent loading and storing of the data between the cache and the MOB, the MOB and the DAC being responsive to one of a plurality of different types of fence requests to force completion of at least one of the microoperations by draining data in the set of buffers of the MOB or data in the request buffers of the DAC, and delaying completion of other microoperations while the data is drained, the different types of fence requests corresponding to different types of memory operations or memory types.

17. The microprocessor of claim 16, wherein the front end does not dispatch instructions in response to one of the fence requests.

18. The microprocessor of claim 16 wherein the bus is drained of data in response to one of the fence requests.

19. The microprocessor of claim 16, further comprising a write-combining buffer, the MOB sending data associated with the executed micro-operations to fill the write combining buffer, the write-combining buffer draining the data to an external memory in response to one of the fence requests.

20. The microprocessor of claim 16 wherein the memory operations corresponding to different types of fence requests are associated with one of serializing instructions, lock operations, input/output operations, write-combining buffer operations, and mode changes.

21. The microprocessor of claim 16 wherein the memory types corresponding to the different types of fence requests comprise one of uncacheable and non-speculatable memory, uncacheable speculatable write-combining memory, a restricted cacheability and speculatable memory, a write-through cacheable and speculatable memory, a write-protected cacheable and speculatable memory, and a write-back cacheable and speculatable memory.

22. A machine-readable medium having stored thereon instructions, which when executed by a set of processors, cause the set of processors to perform the following:

process a plurality of instruction associated with the set of processors;

receive one of a plurality of different types of fence requests by one of the processors;

identify at least one stage of multiple stages in the one processor to drain based on the received fence request;

force completion of at least some of the plurality of instructions associated with the one processor by draining the identified state; and delay processing of instructions corresponding to the other processors in the set while the identified state is drained.

23. The machine-readable medium of claim 22 wherein the plurality of different types of fence requests includes fence requests associated with one of a serializing instruction, lock operation, input/output operation, write-combining buffer operation, memory type, and mode change.

24. The machine-readable medium of claim 22 wherein draining the identified stage comprises draining a bus queue of the one processor.

25. The machine-readable medium of claim 22 wherein draining the identified stage comprises draining a write-combining buffer of the one processor.

* * * * *

UNITED STATES PATENT AND TRADEMARK OFFICE
CERTIFICATE OF CORRECTION

PATENT NO. : 6,708,269 B1 Page 1 of 1
DATED : March 16, 2004
INVENTOR(S) : Tiruvallur et al.

It is certified that error appears in the above-identified patent and that said Letters Patent is hereby corrected as shown below:

Column 3,
Line 15, before ", but would," delete "consuming".

Signed and Sealed this

First Day of June, 2004

JON W. DUDAS
*Acting Director of the United States Patent and Trademark Office*